United States Patent
Chen et al.

(10) Patent No.: US 11,420,144 B2
(45) Date of Patent: Aug. 23, 2022

(54) MULTI-VANE VORTEX TUBES FOR MOTOR VEHICLES

(71) Applicant: S&B Filters, Inc., Fontana, CA (US)

(72) Inventors: Pilun Chen, Fontana, CA (US); Josiah Kufman, Fontana, CA (US); Wayne Daly, Fontana, CA (US)

(73) Assignee: S&B FILTERS, INC, Fontana, CA (US)

( * ) Notice: Subject to any disclaimer, the term of this patent is extended or adjusted under 35 U.S.C. 154(b) by 0 days.

(21) Appl. No.: 16/869,920

(22) Filed: May 8, 2020

(65) Prior Publication Data

US 2020/0353394 A1  Nov. 12, 2020

Related U.S. Application Data (60) Provisional application No. 62/845,739, filed on May 9, 2019.

(51) Int. Cl.
| | |
|---|---|
| *B01D 46/14* | (2006.01) |
| *B01D 46/16* | (2006.01) |
| *F02M 35/022* | (2006.01) |
| *B01D 45/14* | (2006.01) |

(52) U.S. Cl.
CPC .......... *B01D 45/14* (2013.01); *B01D 2221/16* (2013.01); *F02M 35/0223* (2013.01)

(58) Field of Classification Search
CPC .... B01D 45/14; B01D 45/16; B01D 2221/16; F02M 35/0223; B04C 3/00
USPC ......... 55/347, 348, 416, 418, 447, 449, 456, 55/457; 95/269, 271
See application file for complete search history.

(56) References Cited

U.S. PATENT DOCUMENTS

| | | | |
|---|---|---|---|
| 783,603 A | 2/1905 | White | |
| 1,698,361 A | 1/1929 | Dreisbach | |
| 2,323,707 A * | 7/1943 | Harry | B04C 5/28 55/347 |
| 3,360,908 A * | 1/1968 | Baily | F22B 37/32 55/484 |
| 3,740,932 A | 6/1973 | Borsheim | |
| 4,013,137 A | 3/1977 | Petersen | |
| 4,197,102 A | 4/1980 | Decker | |
| 4,236,868 A | 12/1980 | Linhardt | |

(Continued)

FOREIGN PATENT DOCUMENTS

GB    2035151 A  *  6/1980  ............... B04C 3/00

*Primary Examiner* — Minh Chau T Pham (74) *Attorney, Agent, or Firm* — Stetina Brunda Garred & Brucker (57) ABSTRACT

A vortex particle separator has an impeller at a housing inlet with impeller blades spiraling around an impeller shaft and longitudinal axis of the separator to impart either clockwise or counterclockwise rotation to air flowing through the impeller when viewed looking downstream along the axis. The upstream end of each impeller blade is inclined in a direction opposite to the direction the air rotates when passing through the impeller, measured from a radial baseline through the axis and the juncture of the blade with the center shaft of the impeller. Thus, in each orthogonal plane along the axial length of the impeller the juncture of the blade with the housing is offset from the baseline in the rotational direction opposite the direction in which air flows through the impeller. An offset angle of 45° to 55° is believed suitable.

20 Claims, 7 Drawing Sheets

(56) References Cited

U.S. PATENT DOCUMENTS

| | | | |
|---|---|---|---|
| 4,289,611 A * | 9/1981 | Brockmann | B04C 3/06 |
| | | | 209/710 |
| RE33,085 E | 10/1989 | Petersen et al. | |
| 4,985,058 A | 1/1991 | Prinsloo et al. | |
| 6,361,574 B1 | 3/2002 | Decker | |
| 7,104,529 B2 | 9/2006 | Laird et al. | |
| 8,876,961 B2 | 11/2014 | da Silva et al. | |
| 8,945,283 B1 * | 2/2015 | Krishnamurthy | B01D 45/16 |
| | | | 95/271 |
| 9,005,326 B2 * | 4/2015 | Wuebbeling | B04C 3/04 |
| | | | 55/423 |
| 9,539,533 B2 | 1/2017 | Schulz et al. | |
| 10,016,768 B2 | 7/2018 | Van Wolferen et al. | |
| 10,036,319 B2 | 7/2018 | Murray et al. | |
| 2010/0139633 A1 * | 6/2010 | Blossey | B01D 45/16 |
| | | | 123/573 |
| 2014/0165513 A1 | 6/2014 | Oelpke | |
| 2014/0298761 A1 * | 10/2014 | Ackermann | B01D 45/16 |
| | | | 55/457 |
| 2015/0343366 A1 | 12/2015 | Wuebbeling et al. | |
| 2016/0339359 A1 | 11/2016 | Hallot | |

\* cited by examiner

MULTI-VANE VORTEX TUBES FOR MOTOR VEHICLES

CROSS-REFERENCE TO RELATED APPLICATIONS

The present application claims priority to U.S. Provisional Patent Application Ser. No. 62/845,739 filed May 9, 2019, the disclosure of which is incorporated herein by reference.

STATEMENT RE: FEDERALLY SPONSORED RESEARCH/DEVELOPMENT

Not Applicable.

BACKGROUND

Off-road vehicles operate in environments where the air ingested into the air intake of a motor vehicle may contain a large number of particulates such as dust, sand and other debris that cause damage to the engine and that clog normal engine filters using woven materials or paper. Particle separators, sometimes called centrifugal separators, cyclone separators or vortex separators, may be used to separate particles from the air stream based on the weight or size or density of the particles and the rotational speed of a fluid in which centrifugal force urges heavier or larger particles toward the outside of a rotating volume of fluid such as air. But the efficiency and effectiveness of particle separators vary greatly. There is thus a need for an improved particle separator to remove dust and debris from the air intake stream for a motor vehicle engine.

BRIEF SUMMARY

A vortex particle separator has a stationary impeller at the inlet of a generally cylindrical housing with impeller blades spiraling along a longitudinal axis of the vortex separator and extending between the housing and an impeller shaft, so the impeller blades impart either clockwise or counterclockwise rotation to air flowing through the stationary impeller. The upstream end of each impeller blade is inclined in a direction opposite to the direction of rotation imparted by the impeller, measured from a radial baseline through the axis and the juncture of the upstream end of the blade with the center shaft of the impeller. Thus, in each orthogonal plane along the axial length of the impeller, the juncture of the impeller blade with the housing is offset from the baseline in the rotational direction opposite the direction in which the impeller is designed to rotate the air and opposite the direction in which air flows through the impeller. For example, if air flows through the impeller in a clockwise rotational direction when looking along the axis in the downstream direction, then the outer end of the impeller blade at the housing "trails" the inner end of the impeller blade at the center impeller shaft when viewed in a "clockwise" direction at the upstream end of the impeller, and in each orthogonal plane along the axial length of the impeller. Stated differently, if air flows through the impeller in a clockwise rotational direction when looking along the axis in the downstream direction, then the outer end of the impeller blade at the housing "leads" the inner end of the impeller blade at the center impeller shaft when viewed in a "counterclockwise" direction at the upstream end of the impeller, and in each orthogonal plane along the axial length of the impeller.

Whether viewed as a leading angle or a trailing angle, an offset angle $\Theta$ of 45° to 55° is believed suitable, with an offset angle of 49° believed preferable for an impeller with three blades or vanes. For an impeller with four vanes or blades, an offset angle $\Theta$ of 45° to 55° is believed suitable, with an offset angle of 49° believed preferable. As used herein, an impeller shaft "leading" the juncture of the upstream end of each impeller blade and the housing by an angle $\Theta$ measured in the direction of rotation, when viewed downstream along the impeller axis, refers to the angle $\Theta$ and leading/trailing orientation of parts as shown and described in FIGS. 7A and 7B.

Advantageously, the upstream end of the blade is tangent to the outer diameter of the center impeller shaft. Less preferably, but more practically for molding purposes, the impeller blades are advantageously tangent to an imaginary circle having a constant diameter of 90% to 99% the diameter of the upstream end of the impeller shaft at the upstream end of the shaft, and preferably tangent to an imaginary circle having a diameter 96% to 99% the outer diameter of the center impeller shaft which shaft diameter is measured at the upstream end of that shaft.

Advantageously, the upstream end of the blade is tangent to the outer diameter of the center impeller shaft. The impeller and at least the portion of the impeller shaft and the housing to which the impeller blades are connected are advantageously made of molded plastic, and advantageously integrally molded using a single shot, injection molding so the assembly is molded at the same time as a single, unitary piece of material. But it is difficult to mold the impeller blades tangent to the outer diameter of the center shaft, so the upstream end of the impeller blades are advantageously tangent to an imaginary circle of smaller diameter having a diameter 90% to 99% the diameter of the upstream end of the impeller shaft at the upstream end of the shaft, and preferably tangent to an imaginary circle having a diameter 96% to 98% the outer diameter of the center impeller shaft at the upstream end of that shaft. The outer diameter of the housing advantageously increases in a downstream direction at an included angle of 1 to 3 degrees, and the outer diameter of the impeller shaft advantageously decreases in the downstream direction at an angle of about 1 to 2 degrees. Thus, the impeller blades are more advantageously tangent to an imaginary circle having a diameter of 92% to 99% of the diameter of the impeller shaft at the upstream end of that shaft, and preferably tangent to an imaginary circle having a diameter of 96% to 99% the diameter of the impeller shaft at the upstream end of that shaft. These dimensions are for particle separators having a length of 3 to 5 inches and diameters of 1 to 3 inches, with the diameters being proportional to the lengths and following the more detailed dimensions described herein.

Described another way, the upstream end of the upstream facing side of each impeller blade is tangent not to the impeller shaft, but is tangent to an imaginary shaft 10% to 1% smaller in diameter than the actual impeller shaft, and advantageously 8% to 1% smaller in diameter, and preferably 4% to 1% smaller in diameter. The tangential arrangement extends in each orthogonal plane along the length of the longitudinal axis of the impeller. Ideally, the tangent of the upstream facing side of each impeller blade is tangent to an imaginary impeller shaft that is 6% to 10% smaller in diameter than the actual impeller shaft at the upstream end of the impeller, and 4% to 1% smaller in diameter than the actual impeller shaft at the downstream end of the impeller—and the tangent angle varies linearly between the upstream and downstream ends. The tangent orientation of the upper facing side of each impeller blade is maintained in each orthogonal plane along the axial length of the impeller. Each impeller blade is advantageously of a uniform thickness relative to an axis perpendicular to the upward facing surface as that surface extends along the spiral path of the impeller blade.

There is thus provided a vortex particle separator having a housing extending along a longitudinal axis, having an air inlet at an upstream end of the separator and an outlet guide at a downstream end of the separator, and further having a discharge opening in the separator at the downstream end of the separator. This separator may include an impeller at the air inlet. The impeller advantageously has an impeller shaft extending along the longitudinal axis and three to six impeller blades, all extending continuously in one of a clockwise or counterclockwise spiral along and around the shaft and extending between the shaft and the housing. Each impeller blade has the same pitch and further has an upstream facing surface and an opposing downstream facing surface. Each upward facing surface is tangent to an outer diameter of the impeller shaft or to an imaginary cylinder coaxial with the impeller shaft that is from 10% to 1% smaller in diameter than the actual outer diameter of the impeller shaft in a plane orthogonal to the axis of the impeller shaft. The juncture of the upstream end of each impeller blade and the impeller shaft leads the juncture of the upstream end of each impeller blade and the housing by an angle Θ measured in the direction of rotation, when viewed downstream along the impeller axis.

In further variations of this impeller for the particle separator, the imaginary cylinder is 8% to 1% smaller in diameter than the actual outer diameter of the impeller shaft in the respective orthogonal planes. Advantageously, the imaginary cylinder is 4% to 1% smaller in diameter than the actual outer diameter of the impeller shaft in the respective orthogonal planes.

More advantageously, the imaginary cylinder may be 8% to 1% smaller in diameter than the actual outer diameter of the impeller shaft in the respective orthogonal planes, and the outer diameter of the actual impeller shaft may decrease in the downstream direction along the axial length of the impeller. The imaginary cylinder is advantageously 4% to 1% smaller in diameter than the actual outer diameter of the impeller shaft in the respective orthogonal planes, and the diameter of the actual impeller shaft may decrease in the downstream direction along the axial length of the impeller.

In further variations of the above particle separators, each impeller blade is tangent with an outer diameter of an imaginary cylinder extending along the longitudinal axis and having an outer diameter of 90% to 98% the diameter of the impeller shaft when the housing diameter is between 1 and 2 inches. Each impeller blade advantageously has a pitch of 0.4 to 1.4 and a length along the longitudinal axis of 0.7 inches to 2 inches, and a diameter of 0.7 inches to 2 inches.

Advantageously, the impeller has three impeller blades, each having a pitch of 0.6 to 0.8 turns per inch, and a length along the longitudinal axis of 0.6 inches to 0.8 inches, and a housing inner diameter of 1 inch to 1.5 inches at the upstream end of the housing, and the outside diameter of the upstream end of the impeller shaft is 0.4 to 0.6 inches. Alternatively, the impeller has four impeller blades, each having a pitch of 0.5 to 0.6 turns per inch, and a length along the longitudinal axis of 1.2 to 1.5 inches, and a housing inner diameter of 1 to 2 inches at the upstream end of the housing, and the outside diameter of the upstream end of the impeller shaft is 0.5 to 0.7 inches.

Advantageously, each impeller blade has a uniform thickness over a majority of its spiral length when measured along an axis perpendicular to the upward facing surface of the impeller blade. The impeller blades are in a clockwise rotation. Advantageously, each of the above described particle separators may have the impeller blades, impeller shaft and at least a portion of the housing joining the outer ends of the impeller vanes, integrally molded of plastic.

BRIEF DESCRIPTION OF THE DRAWINGS

These and other advantages and features of the invention will be better appreciated in view of the following drawings and descriptions in which like numbers refer to like parts throughout, and in which.

DETAILED DESCRIPTION

As used herein, the following part numbers refer to the following parts: 20—particle separator; 22—housing; 24—longitudinal axis; 26—impeller; 28—outlet guide; 30—discharge opening; 40—impeller blades; 42—impeller shaft; 44—impeller shaft upstream end; 46—inner impeller edge; 48—outer impeller edge; 50—upstream facing surface; 52—downstream facing surface; 60—upstream portion; 62—middle portion; 64—downstream portion; 66—upstream shoulder; 68—downstream shoulder; 70—flange; 72—ramp; 74—groove; and 76—alignment tab.

Referring to FIGS. 1-6, the particle separator 20 is an axial flow separator having a tubular housing 22 extending along longitudinal axis 24. The housing 22 is preferably a generally cylindrical tube with a stationary impeller 26 at an inlet or upstream end of the housing and a tubular outlet guide 28 at an outlet or downstream end of the housing 22 that is opposite the inlet end of the housing 22. Because the impeller 26 is stationary, a fan (not shown) is positioned downstream of the impeller 26 to draw air into the entrance or inlet end of the impeller 26. The impeller 26 has a spiral shape that causes air to rotate as it passes along the longitudinal axis 24 of the housing 22, as described later. Downstream of and separated from the impeller 26 is an outlet guide 28 that directs cleaner air that is closer to the axis 24 out of the outlet end of the housing 22. The housing 22 has one or more discharge openings 30 outward of the outlet guide 28 so particles separated from the rotating airstream can exit the particle separator through the discharge opening 30, and the outlet guide 28 directs air that is further from the longitudinal axis 24 outward toward the discharge opening(s) 30. Air with particulates enters the upstream, inlet end of the particle separator 20, with the impeller 26 imparting a rotation to the airstream which causes heavier particles to move outward toward the housing 22 and exit the discharge opening(s) 30, while the lighter air nearer the longitudinal axis 24 passes through the outlet guide 28 and out the downstream end or outlet end of the particle separator 20. The actual air movement is spiral because the air moves along the axis 24 as it rotates.

The impeller shaft 42 extends along the longitudinal axis 24 and advantageously has an upstream impeller shaft end 44 that is shaped to direct air outward from the longitudinal axis 24 and into the impeller vanes or blades 40. In the depicted embodiment the impeller 26 is a stationary impeller with three impeller vanes or blades 40 extending along an impeller shaft 42 in a spiral path. The arrows show the clockwise direction of inclination of the impeller stationary impeller blades 40 and shows the clockwise direction of airflow through the stationary impeller blades 40. The clockwise and counterclockwise directions are looking along the longitudinal axis 24 from the upstream end to the downstream end of the particle separator and the longitudinal axis 24.

The depicted impeller shaft end 44 is domed, preferably rounded to form a portion of a hemispherical shape. The impeller shaft 42 is preferably a cylindrical tube so the impeller shaft end 44 blends tangentially with the cylindrical walls of the tubular shaft 42. Preferably, the impeller's upstream shaft end 44 has an outer radius the same as the radius of the cross-section of the cylindrical shaft 42 to form a domed end joining smoothly with the cylindrical impeller shaft 42. Other shapes of the impeller shaft end 44 are believed suitable, including conical and frusto-conical cross-sectional shapes (viewed in a plane along the longitudinal axis 24), and including shapes with convex or concave surfaces viewed in that plane along the longitudinal axis. The impeller shaft's upstream end advantageously has smaller cross-sections orthogonal to the axis 24 upstream and larger cross-sections downstream to direct air outward from the longitudinal axis 24.

The impeller blade(s) 40 are stationary and have an inner edge 46 (FIGS. 1-2) joining the cylindrical portion of impeller shaft 42, and an outer edge 48 joining an inner surface of the housing 22 at the inlet end (upstream end) of the impeller 26. Each of the inner and outer edges form a spiral extending in the downstream direction along the longitudinal axis 24. Each impeller blade 40 has an upstream facing surface 50 and an opposing downstream facing surface 52. The thickness of each impeller blade 40 increases in an outward direction from axis 24, with the thickness when measured along a constant radial distance from longitudinal axis 24 being smaller at the inner impeller edge 46 and larger at the outer impeller edge 48 as best seen in FIGS. 2B, 4B, 5B and 6B.

As best seen in FIGS. 1, 2A, 3B and 4C, the impeller blades 40 spiral along the length of the longitudinal axis 24 in a clockwise direction when viewed along the longitudinal axis 24 from the upstream, inlet end of the particle separator 20 and impeller 26. Thus, the inner and outer impeller edges 46, 48 wind along the axis 24 in a clockwise direction from the upstream, leading end of the impeller 26 to the downstream, trailing end of the impeller 26 when viewed as in FIGS. 1, 2B and 4B. As air passing through the stationary impeller 26 from the upstream end at the impeller shaft end 44, to the downstream end at outlet guide 28, the air is caused to rotate in a clockwise rotation by the impeller blades 40, so the air rotates in a spiral path as it moves along the longitudinal axis 24 from the inlet to the outlet of the particle separator 20.

Referring to FIGS. 1, 2A, 3B and 4C, the impeller blades 40 begin at a first plane extending radially from (or orthogonal to) longitudinal axis 24 at the upstream end (inlet end) of housing 22, and extend continuously downstream along the axis 24 to a second plane that also extends radially (or orthogonal to) the axis 24.

Figure 7A:
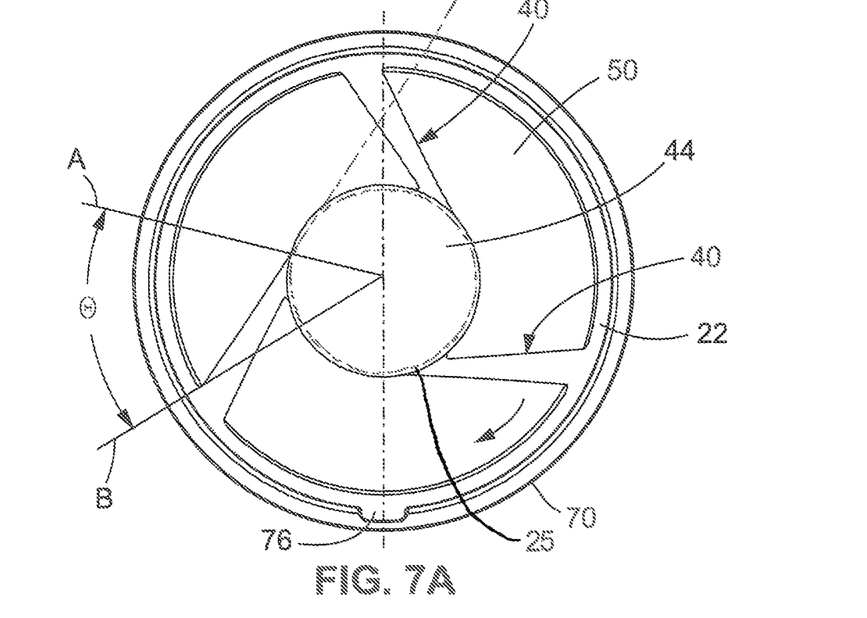
FIG. 7A is an enlarged view of the left side or front end view of the separator of FIGS. 1 and 4A, showing blade inclination.

Referring to FIG. 7A, the relative orientation of the upstream ends of the blades 40 in the same orthogonal plane, depends on how they are viewed. Radial line A extends through the juncture of the upstream end of the blade 40 (covered by the impeller shaft's upstream end 44) and the outside of the impeller shaft and through the axis 24 when viewed in the downstream direction. Radial line B extends through the juncture of the blade 40 (covered by the impeller shaft's upstream end 44) and the housing 22, using the same side of the blade 40 and viewed in the same downstream direction along the axis 24. Measured in the clockwise direction of air rotation and the spiral blades 40, radial line A leads radial line B by angle Θ, and the blade's juncture with the impeller housing leads the blade's juncture with the housing 22 by angle Θ. That angle will vary with the relative diameters of the impeller shaft 42 and the housing 22 and will vary depending on which side of the impeller blade 40 is used for the junctures with the shaft 42 and housing 22.

Figure 1:
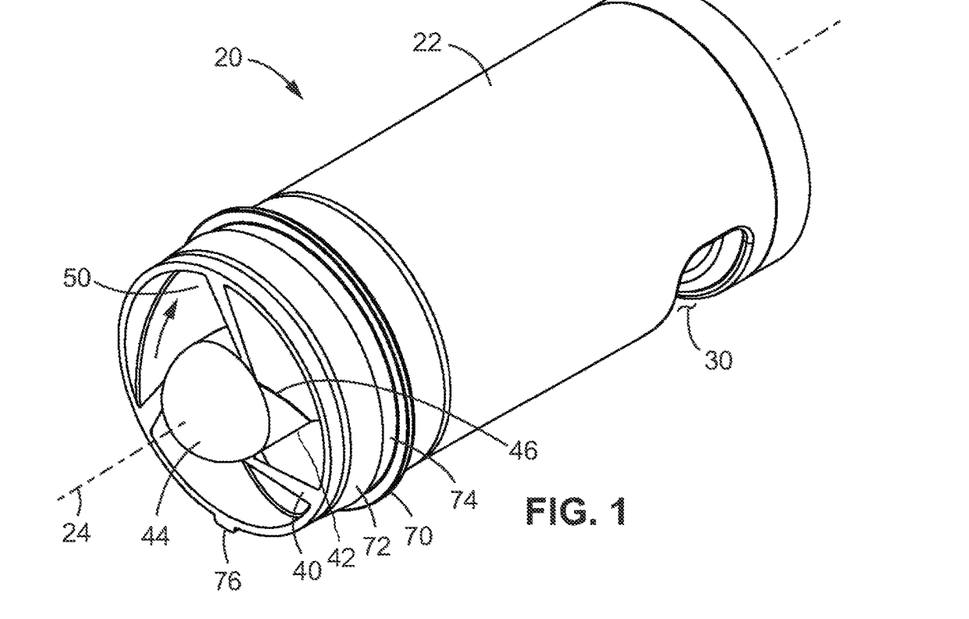
FIG. 1 is a perspective view of a centrifugal separator having three impeller blades or vanes.
Figure 2A:
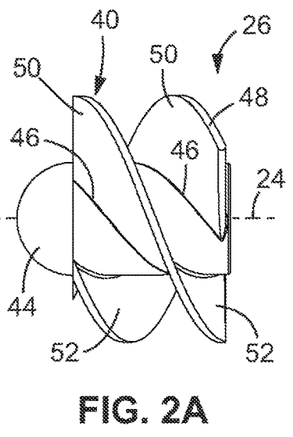
FIG. 2A is a side view of a three-blade impeller of FIG. 1.
Figure 2B:
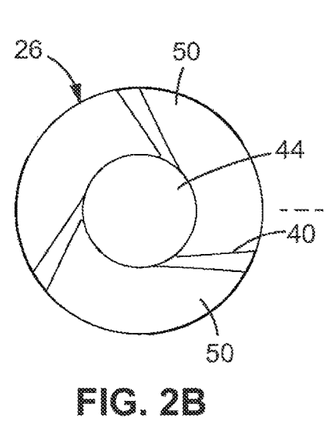
FIG. 2B is a left or front view of the three-blade impeller of FIG. 2A.
Figure 2C:
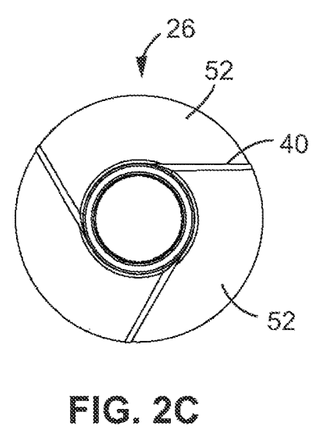
FIG. 2C is a right side or rear view of the three-blade impeller of FIG. 2A.
Figure 3A:
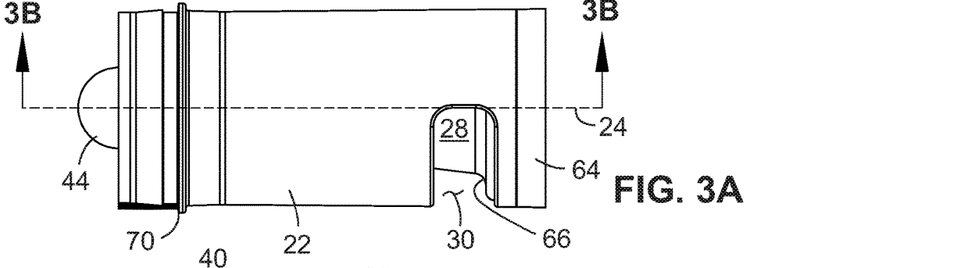
FIG. 3A is a side view of the separator of FIG. 1.
Figure 3B:
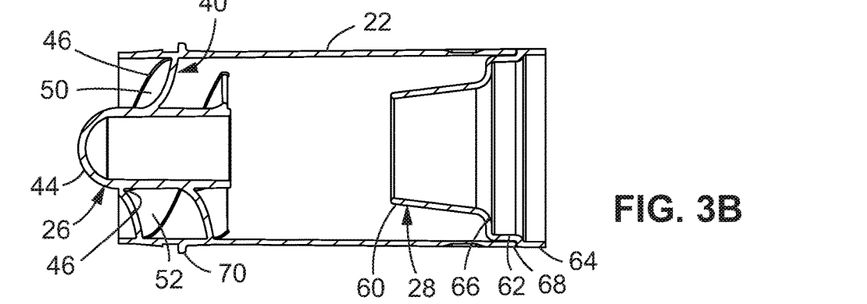
FIG. 3B is a sectional view taken along section 3B-3B of FIG. 3A.
Figure 4A:
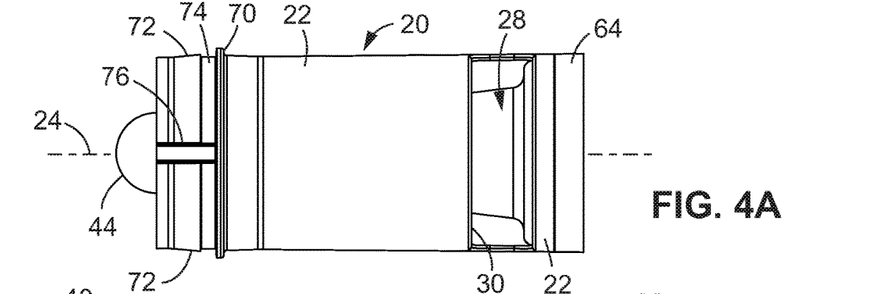
FIG. 4A is a bottom view of the separator of FIG. 3A.
Figure 4B:
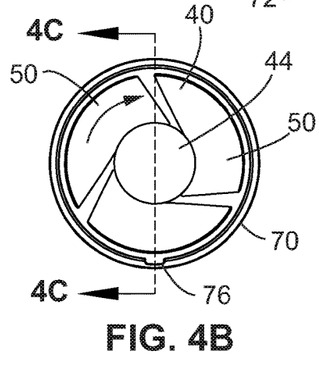
FIG. 4B is a left side or front end view of the separator of FIGS. 4A and 4C.
Figure 4C:
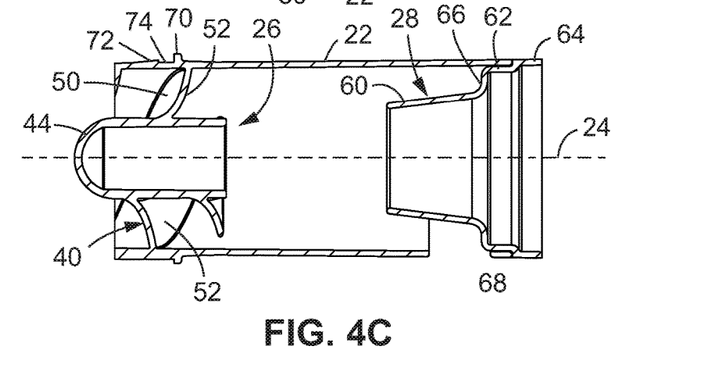
FIG. 4C is a sectional view taken along section 4C-4C of FIG. 4B.
Figure 5A:
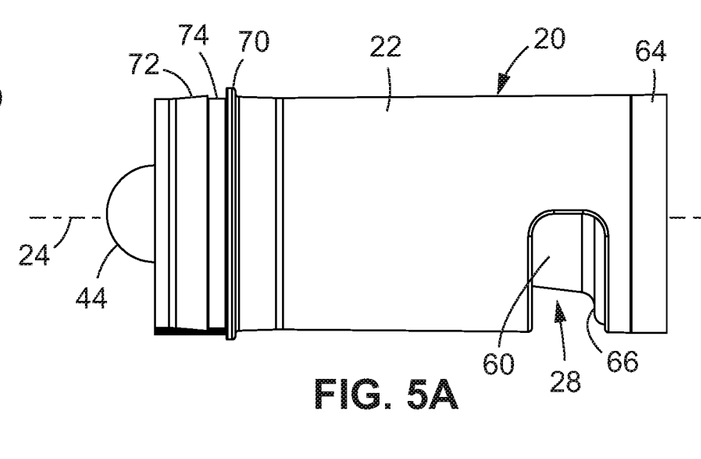
FIG. 5A is a side view of the separator of FIG. 1.
Figure 5B:
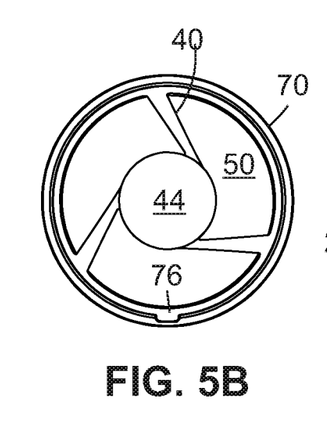
FIG. 5B is a left side or front end view of the separator of FIG. 5A.
Figure 5C:
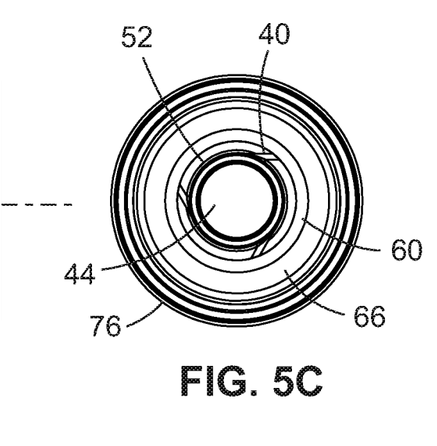
FIG. 5C is a right side or rear view of the separator of FIG. 5A.
Figure 6A:
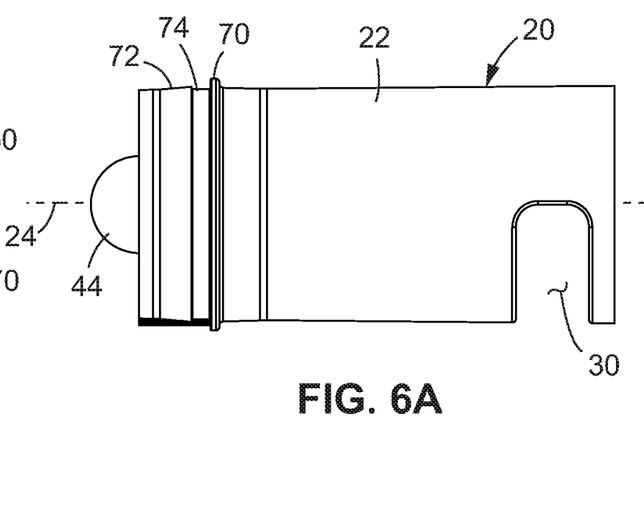
FIG. 6A is a side view of the separator of FIG. 5A with an impeller but no outlet guide.
Figure 6B:
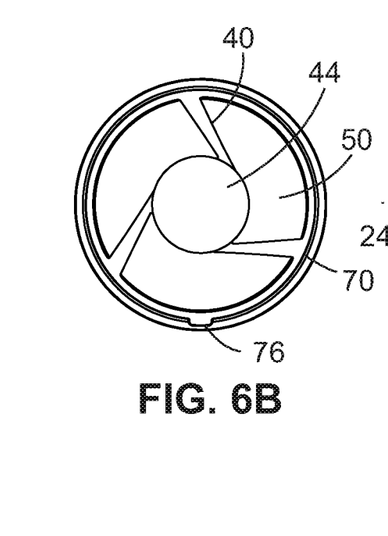
FIG. 6B is a left side or front end view of the separator of FIG. 6A.
Figure 6C:
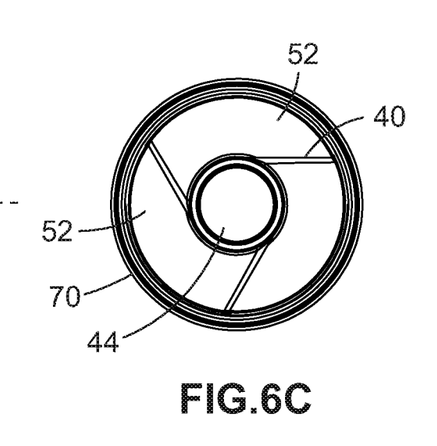
FIG. 6C is a right side or rear view of the separator of FIG. 6A.

When viewed in the counterclockwise direction, the juncture of the blade 40 with the housing 22 (radial line B) leads the juncture of the blade 40 with the impeller shaft 42 (radial line A) by the same angle Θ, which angle can vary depending on the above identified factors. If the impeller blades 40 spiraled around the impeller shaft 42 in a counterclockwise direction (instead of clockwise), then each impeller blade 40 would be inclined in the opposite direction as shown in FIGS. 2, 5 and 6, and the above comments on orientation would be reversed.

The three impeller blades 40 are preferably equally spaced about the impeller shaft 42, and each blade preferably revolves 0.5 turns about the axis 24 and impeller shaft 42, over a distance of 0.7 inches and a pitch of 0.7 turns per inch. A pitch of 0.65 to 0.75 turns per inch is believed suitable but less desirable, and a pitch of 0.6 to 0.8 turns per inch is also believed usable but less desirable. As each impeller blade 40 has the same pitch, the blades are equally spaced or parallel to each other as they spiral around the longitudinal axis 24 and the impeller shaft 42. The axial length of the impeller 26 is thus preferably 0.8 inch, although lengths of 0.5 inch to 1 inch are believed suitable for a housing 22 having an outer diameter of about 1 inch. The particle separator 20 has an axial length of 3 inches, with an upstream inlet opening diameter of 1.2 inches at the inner surface of the housing 22 in the plane of the upstream end of the impeller 26. The downstream end of the impeller 26 is 1.1 inches from the upstream end of the outlet guide 28.

The upstream facing surface 50 is preferably tangent to the outer surface of the impeller shaft 42 in each orthogonal plane along the length of the longitudinal axis 24 along which the impeller 26 extends. It is believed this may be accomplished by molding the impeller 26 separately and then inserting it into and connecting it to the upstream end of a separately formed housing 22. Advantageously, the impeller 26 (and its impeller shaft 42) is integrally molded with at least that portion of the housing that connects to the outer ends of the impeller blades 40. As used herein, "integrally molded" refers to the entire part being molded at the same time, preferably from a single shot, injection molding operation, as distinguished from parts made separately and then permanently connected together as for example, by adhesives, friction welding, heat fusing, etc.

When the impeller 26 is integrally molded with the housing 22, as for example by single shot injection molding, then the upstream facing surface 50 is preferably tangent to an imaginary cylindrical surface 25 (shown as a circle in FIG. 7A based on the corresponding perspective) of uniform diameter that extends along and is centered on axis 24 and has a diameter of 90% to 99% the outer diameter of the upstream end of the impeller shaft 42—not including the shaft's upstream end 44 which may have a variable geometry to direct air away from the longitudinal axis 24. More preferably the tangent is to an imaginary cylindrical surface 25 having a diameter of 92% to 99% the diameter of the upstream end of the impeller shaft 42 at the upstream end of the shaft 42, and preferably tangent to an imaginary cylindrical surface 25 having a diameter 96% to 99% the outer diameter of the center impeller shaft 42 which shaft diameter is measured at the upstream end of that shaft 42.

The upstream end of the upstream facing side 50 of each impeller blade 40 is thus tangent not to the impeller shaft 42, but to an imaginary shaft which defines the imaginary cylindrical surface 25 and is 10% to 1% smaller in diameter than the actual impeller shaft 42, and advantageously 8% to 1% smaller in diameter, and preferably 4% to 1% smaller in diameter. The tangential arrangement extends in each orthogonal plane along the length of the longitudinal axis 24 and the impeller 26. Ideally, the tangent of the upstream facing side 50 of each impeller blade 40 is tangent to an imaginary impeller shaft that is 6% to 10% smaller in diameter than the actual impeller shaft 42 at the upstream end of the impeller 26, and 4% to 1% smaller in diameter than the actual impeller shaft 42 at the downstream end of the impeller 26—and varies linearly between the upstream and downstream ends. The tangent orientation of the upper facing side 50 of each impeller blade 40 extends in each orthogonal plane along the axial length of the impeller 26. Each impeller blade 40 is advantageously of a uniform thickness relative to an axis perpendicular to the upward facing surface 50 as the surface 50 extends along the spiral path of that surface 50.

Referring to FIGS. 1-6, the outlet guide 28 is preferably a tube with different portions having different diameters, that is centered on and extends along the longitudinal axis 24. The outlet guide 28 is preferably a single, tubular piece having an upstream portion 60, a middle portion 62 and downstream end portion 64. The upstream portion 60 may have a tubular, frusto-conical shape with a smaller diameter upstream end and a larger diameter downstream end that connects to the middle portion 62 by a shoulder 66 that advantageously extends radially outward. A truncated conical shape having uniform thickness walls inclined at an included angle of 12° to 20° is believed suitable, with an included angle of 14° believed preferable. An included angle of 14° corresponds to an angle of 7° relative to an axis parallel to longitudinal axis 24. The middle portion 62 advantageously has an outer diameter sized the same as or slightly smaller than the inner diameter of the adjacent portion of the housing 22. The downstream portion 64 preferably has the same outer diameter as the housing 22 and has the same thickness, with a downstream shoulder 68 extending radially outward between the downstream end of the middle portion 62 and the upstream end of the downstream portion 64. As best seen in FIGS. 3B, 4C and 5A, the outlet guide 28 forms a three-stepped outer surface with the downstream end of the cylindrical housing 22 resting on the downstream shoulder 68 and preferably contacting or adjacent to the outward facing surface of the middle portion 62. The downstream end of the impeller 26 is spaced apart from the upstream end of the outlet guide 28 a distance sufficient to separate particles of a predetermined density or size from the air stream passing through the upstream, open end of the outlet guide (the open end of the upstream portion 60).

In the depicted embodiment, the housing 22 has an outer diameter of 1 inch and the downstream end of the impeller 26 is about 0.9 to 1.2 inches from the opening defined by the upstream portion 60 of the outlet guide 28—measured along the longitudinal axis 24. Preferably, the impeller 26 and outlet guide are 1.1 inches apart, measured along the axis 24. In the depicted embodiment, the outer diameter of the impeller shaft 42 is about 0.5 to 0.6 inches, preferably about 0.55 inches. The inner diameter of the opening defined by the upstream end of the upstream portion 60 is 0.6 to 0.8 inches, preferably 0.7 inches for a one-inch diameter housing 22.

The discharge opening 30 is preferably located along the axis 24 somewhere along the axial length of the outlet guide 28, at a location where the particulates separated from the airstream can be discharged from inside the housing 22. In the depicted embodiment, the discharge opening 30 extends around about ⅓ the circumference of the downstream end of the housing 22, and extends axially from the about the middle of the upstream portion 60 to the juncture of the downstream shoulder 68 of the outlet guide 28 with the housing 22. That location allows a curved juncture between the upstream portion 32 and the shoulder 66 to direct air and particles outward through the discharge opening 30. The discharge opening 30 is advantageously located in the portion of the housing facing earth so gravity helps the particulates exit through the discharge opening 30. But the discharge opening 30 could extend around the entire circumference of the downstream end of the particle separator 20—provided there are intermittent supports for the outlet guide 28.

The location and size of the discharge opening 30 will vary depending on the velocity of the air through the impeller 26 and the mass and size of the particulates designed to be removed from the airstream. In the depicted embodiment the discharge opening 30 has an axial length of about 0.3 to 0.5 inches, and preferably an axial length of 0.4 inches, and extends around an arc of 90° to 150° and preferably extends around an arc of 120°. Advantageously, the outlet guide 28 extends about 0.2 to 0.5 inches upstream of the discharge opening, and preferably extends 0.3 inches upstream of that discharge opening.

The particle separator housing 22 may be configured to snap into a manifold holding a plurality of particle separators 20 parallel to each other to increase the volume of air from which particles are separated. An alignment tab 76 extending along a length of outer side of the housing 22 may be used to align and orient each particle separator 20, by fitting into a corresponding female slot in a manifold. Other male/female alignment mechanisms may be used and thus the housing 22 may contain a longitudinal recess instead of a longitudinal tab or boss for alignment purposes or may be formed with or provided with other alignment features, protrusions or recesses on the housing or other portions of the particle separator.

A flange 70 may encircle the upstream end of the housing 22 and extend radially outward a distance sufficient to prevent passage through a mating opening in the manifold. The flange 70 is shown as continuous but could be intermittent and is preferably a continuous flange with a circular outer periphery. An outwardly extending ramp 72 may be formed upstream of the flange 70, the ramp 72 having an upstream end the same diameter as the outer surface of the housing 22 and the downstream end having a larger diameter but preferably smaller in diameter or outward dimension than that of the flange 70. Between the downstream end of the ramp 72 and the flange 70 is an annular groove 74 and mating latches on the manifold or walls on the manifold may fit into that groove 74 to retain the upstream end of the particle separator to the manifold.

Referring to FIGS. 7B-13, a particle separator 120 is shown having four blades or vanes 140 on the impeller 126. Except for the number of vanes or blades 140, the various parts have the same or similar construction and function as described in the first embodiment of FIGS. 1-7A, and the like parts have numbers that are incremented by 100. Thus, the particle separator 120 has housing 122 extending along longitudinal axis 124 with impeller 126 at an upstream end of the separator and an outlet guide 128 at the downstream end, with discharge opening 130 located along the axial length of the outlet guide to discharge particles from the airstream passing through the outlet guide 128.

The impeller 126 has its impeller vanes or blades 140 extending from the (preferably) tubular impeller shaft 142. The impeller shaft 142 has upstream end 144 which is configured using the same criteria as described for upstream impeller end 44. The impeller 126 has the blades 140 extending from the impeller shaft 142 along an inner impeller edge 146 which follows a spiral path around the impeller shaft 142. The impeller blades 140 extend between the shaft 142 and the impeller housing 122, following that spiral path. Each impeller blade 140 has an upstream facing surface 150 and a downstream facing surface 152. Downstream of the impeller, the outlet guide 128 has an upstream portion 160, middle portion 162 and downstream portion 164 with an upstream shoulder 166 between the upstream portion and middle portion, and a downstream shoulder 168 between the middle portion 162 and downstream portion 164.

The upstream end of the housing 122 may have an outwardly extending radial flange 170, separated from the larger diameter end of a conical ramp 172 by an annular groove 174, to form a catch for a snap lock engagement with a manifold as in the first embodiment. An alignment tab 176 or other alignment feature may be provided on the housing or other portions of the particle separator 120.

Figure 7B:
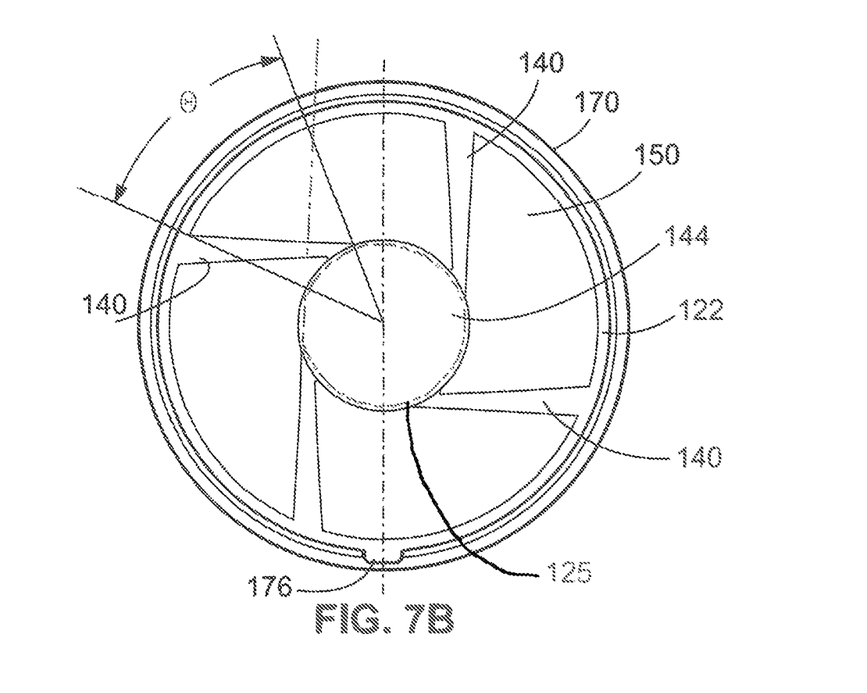
FIG. 7B is an enlarged view of the left side or front end view of the separator of FIG. 8, showing blade inclination.
Figure 8:
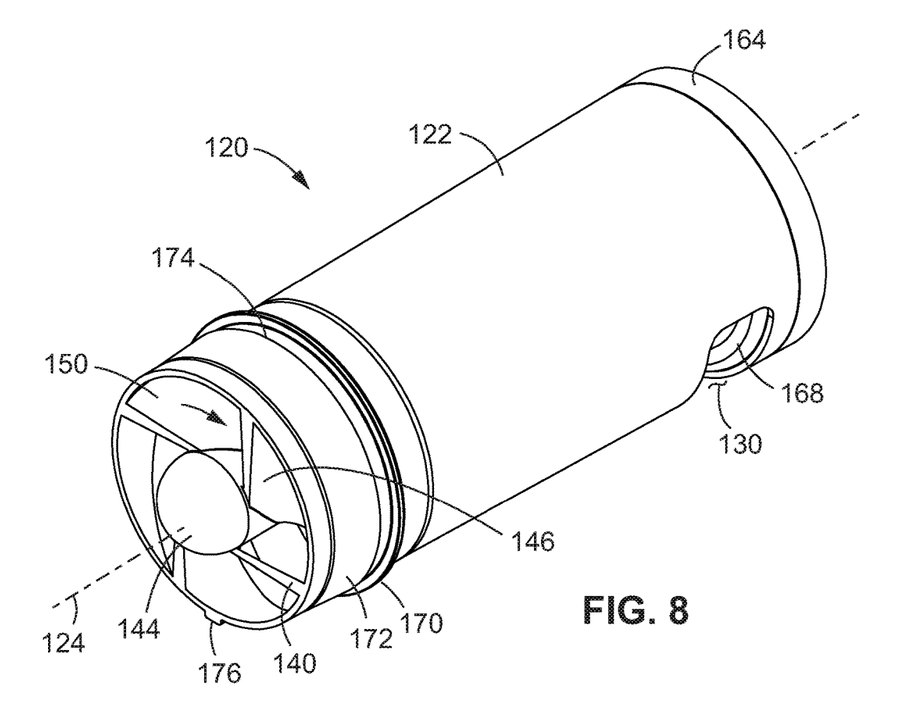
FIG. 8 is a perspective view of a centrifugal separator having four impeller blades or vanes.

As best seen in FIG. 7B, for an impeller 126 with four vanes or blades 140, an offset angle $\Theta$ of 45° to 55° is believed suitable, with an offset angle of 49° believed preferable.

In the preferred configuration, the particle separator 120 with four vanes or blades 140 has each blade revolving 0.7 turns over an axial distance of 1.3 inches, for a particle separator 120 with an inlet end diameter of 1.5 inches formed by the housing 122 at the beginning of the impeller 126, and an outer diameter of 2 inches at the outlet end of the particle separator formed by the downstream portion 164. The preferred embodiment of the particle separator 120 has a length of 3.5 inches, with the impeller having a length of 1.3 inches and an upstream end having a diameter of 0.6 inches. The downstream end of the impeller 126 is 1.4 inches from the upstream end of the outlet guide 128. The upstream portion 160 of the outlet guide has a length of 0.7 to 0.8 inches and an upstream inlet diameter of 0.9 inches, widening in a downstream direction at an included angle of 14°. The discharge opening 130 has an axial length of 0.5 inches. It is believed that each of these physical dimensions can vary by 0.1 inches (+ or −) and perform suitably. The pitch may vary by half or double the ideal pitch.

As with the first embodiment, the impeller blades 140 are tangent to the outer surface of the impeller shaft 142, or offset inward so they are tangent to an imaginary cylinder of smaller diameter.

Advantageously, the upstream end of each blade 40, 140 is tangent to the outer diameter of the center impeller shaft 42, 142. But impeller 26, 126 and at least the portion of the impeller shaft 42, 142 and the housing 22, 122 to which the impeller blades are connected are advantageously made of molded plastic, and advantageously integrally molded using a single shot, injection molding so the assembly is molded at the same time as a single, unitary piece of material. But it is difficult to mold the impeller blades 40, 140 tangent to the outer diameter of the impeller shaft 42, 142, so the upstream end of the impeller blades 40, 140 are advantageously tangent to an imaginary cylindrical surface 125 of smaller diameter than the impeller shaft, having an imaginary diameter 90% to 99% the actual diameter of the upstream end of the impeller shaft 42, 142 measured at the upstream end of that shaft. The blades 40, 140 are preferably tangent to an imaginary cylindrical surface 125 having a diameter 96% to 98% the actual outer diameter of the impeller shaft 42, 142 at the upstream end of that shaft 42, 142.

During outer diameter of the housing 22, 122 advantageously increases in a downstream direction at an included angle of 1 to 2 degrees and, and the outer diameter of the impeller shaft 42, 142 advantageously decreases in the downstream direction at an angle of about 1 to 2 degrees. Thus, the impeller blades 40, 140 are advantageously tangent to an imaginary cylindrical surface 125 having a diameter of 92% to 99% of the diameter of the impeller shaft 42, 142 at the upstream end of that shaft 42, 142, while the downstream end of the impeller shaft 42, 142 has the blades 40, 140 preferably tangent to an imaginary cylindrical surface 125 having a diameter of 96% to 99% the diameter of the actual impeller shaft 42, 142 measured at the upstream end of that shaft 42, 142. The change is preferably linear along the axial length of the impeller 26, 126. These dimensions are believed suitable for particle separators having a length of 3 to 5 inches and diameters of one to two inches, with the diameters being proportional to and smaller than the lengths.

The particle separator 20, 120 is made molding the impeller 26, 126 with the housing 22. Advantageously, a single shot, injection mold integrally forms the impeller 26, 126, impeller blades 40, 140 and housing 22, 122 at the same time to form a single piece, unitary part. A male, core mold is inserted through the downstream end of the housing and rotates for removal from the molded impeller blades 40, 140. The flange, 70, 170, ramp 72, 172 and groove 74, 174 are also molded at the same time as the impeller 26, 126 and housing 22, 122. The outlet guide 28, 128 is then fastened to the downstream end of the housing 22, 122, using adhesives, friction molding, or other fastening mechanisms.

The impellers 26, 126 are described with 3-4 blades, but impellers with 5-6 blades are believed suitable. As used herein, any reference to at least three blades is believed to include from 3 to six blades on the impeller. The particle separators 20, 120 have lengths from 3 to 5 inches and impellers from 1 to 2 inches in length and 1 to 3 inches in diameter. The increase in impeller length does not significantly improve performance so impeller lengths the same as or less than the diameter are believed suitable, with impellers of one inch and pitches between 0.5 and 1 believed desirable.

Referring to FIGS. 3B, 4C, 10B, 11C, the blades 40, 140 appear to have a curved shape in the longitudinal sections, with the upstream facing surfaces 50, 150 being concave and the downstream facing surfaces 52, 152 being convex. That curvature results from the tangential orientation of the blades in the plane orthogonal to the axis 24, 124.

Figure 9A:
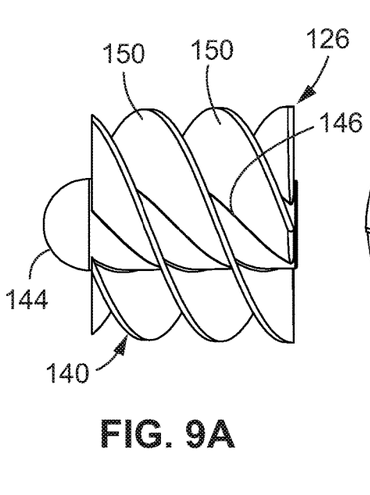
FIG. 9A is a side view of the four-blade impeller of FIG. 8.
Figure 9B:
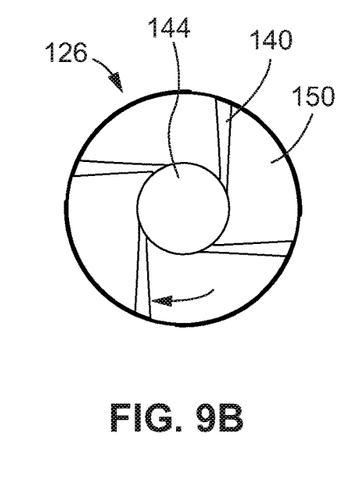
FIG. 9B is a left or front view of the four-blade impeller of FIG. 9A.
Figure 9C:
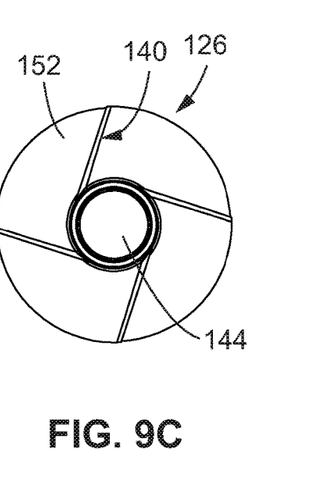
FIG. 9C is a right side or rear view of the four-blade impeller of FIG. 9A.
Figure 10A:
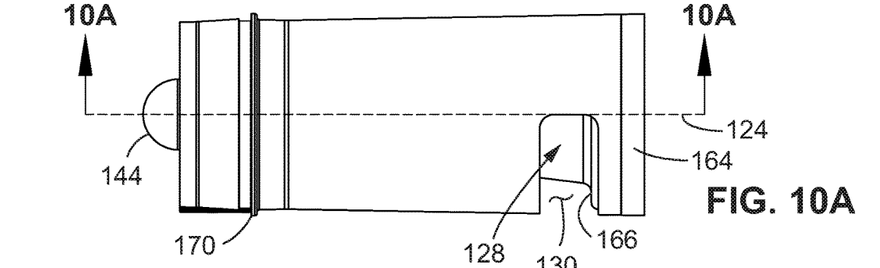
FIG. 10A is a side view of the separator of FIG. 8.
Figure 10B:
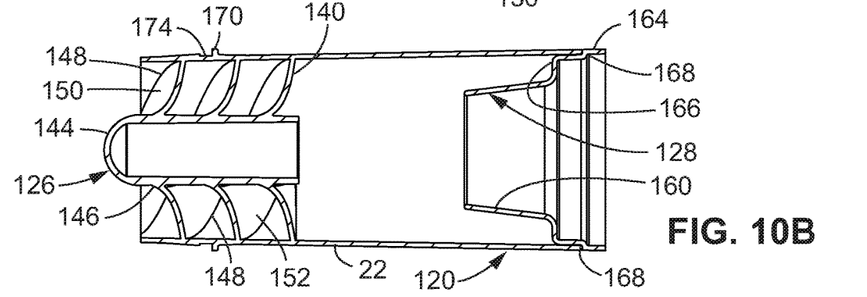
FIG. 10B is a sectional view taken along section 10B-10B of FIG. 10A.
Figure 11A:
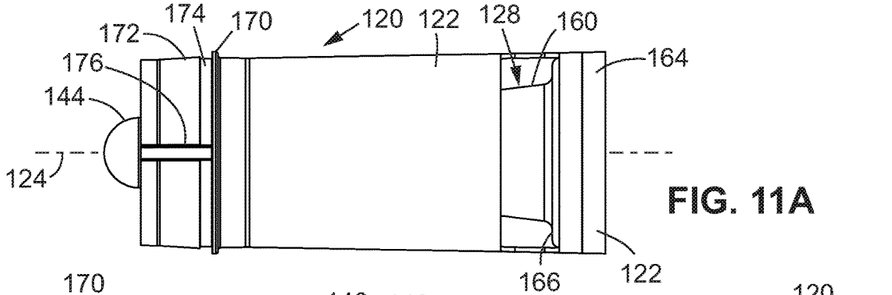
FIG. 11A is a bottom view of the separator of FIG. 10A.
Figure 11B:
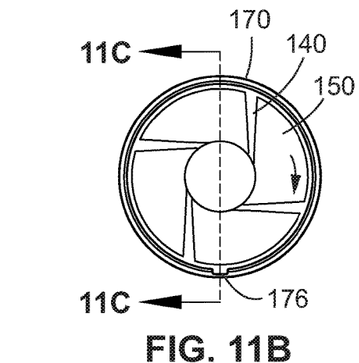
FIG. 11B is a left side or front end view of the separator of FIG. 10A.
Figure 11C:
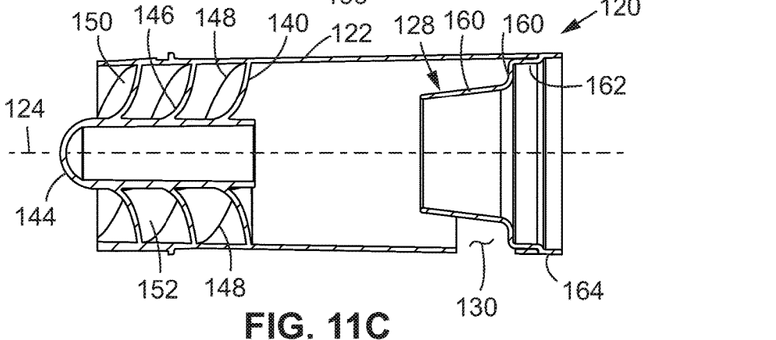
FIG. 11C is a sectional view taken along section 11C-11C of FIG. 11B.
Figure 12A:
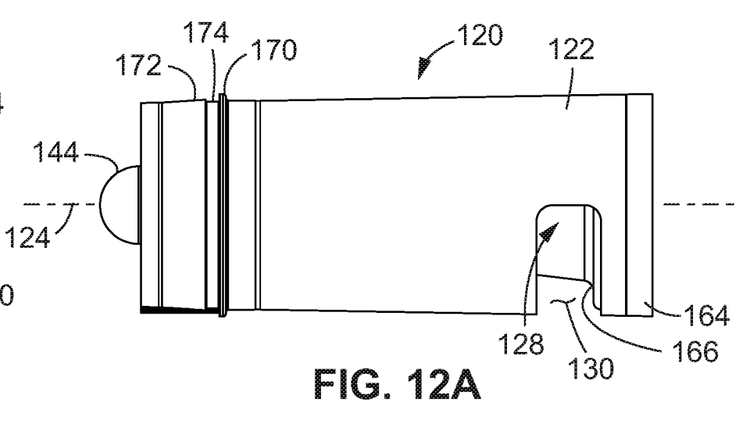
FIG. 12A is a side view of the separator of FIG. 8.
Figure 12B:
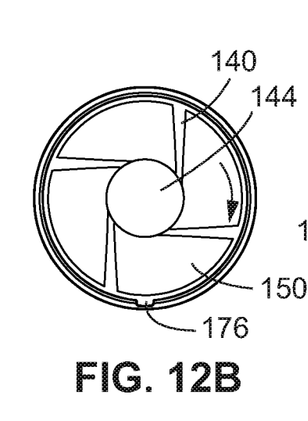
FIG. 12B is a left side or front end view of the separator of FIG. 12A.
Figure 12C:
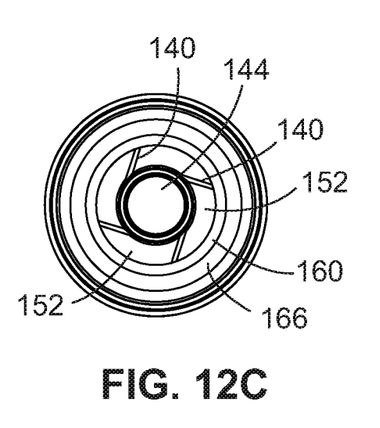
FIG. 12C is a right side or rear view of the separator of FIG. 12A.
Figure 13A:
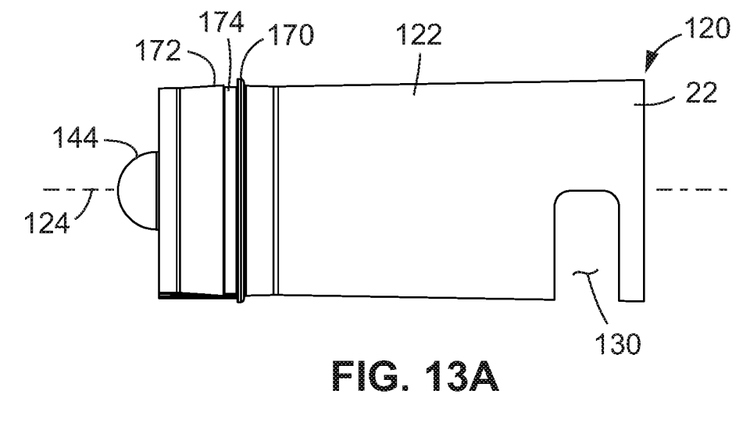
FIG. 13A is a side view of the separator of FIG. 8, with an impeller but no outlet guide.
Figure 13B:
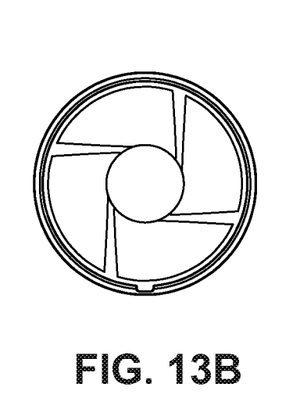
FIG. 13B is a left side or front end view of the separator of FIG. 13A.
Figure 13C:
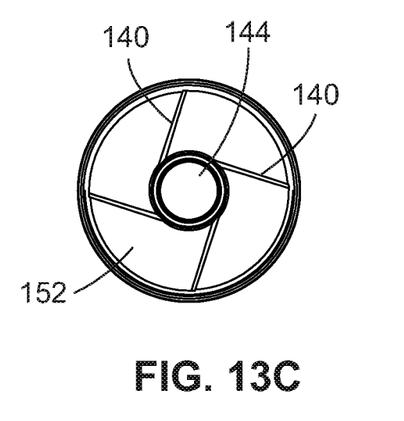
FIG. 13C is a right side or rear view of the separator of FIG. 13A.

Referring to FIGS. 1, 2B, 7A-7B, 8 and 11B, the upstream ends of the impeller blades 40, 140 appear thinner at the impeller shaft 42, 142 and thicker adjacent the housing 22, 122. The impeller blades 40, 140 have a substantially uniform thickness when measured along an axis perpendicular to the surfaces 50, 52, 150 or 152. The visual change in thickness is an artifact of the spiral aspect of the blades 40, 140. The upstream end of the blades 40, 140 and housing 22, 122 advantageously all begin in the same plane, which plane is orthogonal to the longitudinal axis 24, 124, and the blades 40, 140 advantageously end in the same orthogonal plane, as shown in FIGS. 2A and 9A.

As required, detailed embodiments of the present invention are disclosed herein; however, it is to be understood that the disclosed embodiments are merely exemplary of the invention, which may be embodied in various forms. While the above embodiments are described regarding impellers with relatively small diameters and lengths, and from three to six impeller blades, other sizes of impellers may be used and fewer and greater numbers of impeller blades may be used. Therefore, specific structural and functional details disclosed herein are not to be interpreted as limiting, but merely as a basis for the claims and as a representative basis for teaching one skilled in the art to variously employ the present invention in virtually any appropriately detailed structure.

The above description is given by way of example, and not limitation. Given the above disclosure, one skilled in the art could devise variations that are within the scope and spirit of the invention, including various ways of varying the dimensions as the length and diameter of the impeller varies. Further, the various features of this invention can be used alone, or in varying combinations with each other and are not intended to be limited to the specific combination described herein. Thus, the invention is not to be limited by the illustrated embodiments.

What is claimed is:

1. A vortex particle separator comprising:
a housing extending along a longitudinal axis and having an air inlet at an upstream end, an air outlet at a downstream end;
an impeller proximate the air inlet, the impeller having an impeller shaft extending along the longitudinal axis and three to six impeller blades all extending continuously in one of a clockwise or counterclockwise spiral along and around the shaft and extending between the shaft and the housing, each impeller blade having the same pitch, each impeller blade having an upstream facing surface and an opposing downstream facing surface, each upward facing surface being tangent to an outer diameter of the impeller shaft or to an imaginary cylinder coaxial with the impeller shaft that is from 10% to 1% smaller in diameter than the actual outer diameter of the impeller shaft in a plane orthogonal to the axis of the impeller shaft, with the juncture of an upstream end of each impeller blade and the impeller shaft leading the juncture of the upstream end of each impeller blade and the housing by an angle Θ measured in the direction of rotation, when viewed downstream along the impeller axis.

2. The particle separator of claim 1, wherein the imaginary cylinder is 8% to 1% smaller in diameter than the actual outer diameter of the impeller shaft in the respective orthogonal planes.

3. The particle separator of claim 1, wherein the imaginary cylinder is 4% to 1% smaller in diameter than the actual outer diameter of the impeller shaft in the respective orthogonal planes.

4. The particle separator of claim 1, wherein the imaginary cylinder is 8% to 1% smaller in diameter than the actual outer diameter of the impeller shaft in the respective orthogonal planes, and the outer diameter of the actual impeller shaft decreases in the downstream direction along the axial length of the impeller.

5. The particle separator of claim 1, wherein the imaginary cylinder is 4% to 1% smaller in diameter than the actual outer diameter of the impeller shaft in the respective orthogonal planes, and the diameter of the actual impeller shaft decreases in the downstream direction along the axial length of the impeller.

6. The particle separator of claim 1, wherein each impeller blade is tangent with an outer diameter of an imaginary cylinder extending along the longitudinal axis and having an outer diameter of 0.9 to 0.98 the diameter of the impeller shaft when the housing diameter is between 1 and 2 inches.

7. The particle separator of claim 1, wherein each impeller blade has a pitch of 0.4 to 1.4 and a length along the longitudinal axis of 0.7 inches to 2 inches, and a diameter of 0.7 inches to 2 inches.

8. The particle separator of claim 1, wherein there are three impeller blades, each having a pitch of 0.6 to 0.8 turns per inch, and a length along the longitudinal axis of 0.6 inches to 0.8 inches, and a housing inner diameter of 1 inch to 1.5 inches at the upstream end of the housing, and the outside diameter of the upstream end of the impeller shaft is 0.4 to 0.6 inches.

9. The particle separator of claim 1, wherein there are four impeller blades, each having a pitch of 0.5 to 0.6 turns per inch, and a length along the longitudinal axis of 1.2 to 1.5 inches, and a housing inner diameter of 1 to 2 inches at the upstream end of the housing, and the outside diameter of the upstream end of the impeller shaft is 0.5 to 0.7 inches.

10. The particle separator of claim 1, wherein each impeller blade has a uniform thickness over a majority of its spiral length when measured along an axis perpendicular to the upward facing surface of the impeller blade.

11. The particle separator of claim 1, wherein the impeller blades are in a clockwise rotation.

12. The particle separator of claim 1, wherein the impeller blades, impeller shaft and at least a portion of the housing joining the outer ends of the impeller blades, are integrally molded of plastic.

13. The particle separator of claim 2, wherein the impeller blades, impeller shaft and at least a portion of the housing joining the outer ends of the impeller blades, are integrally molded of plastic.

14. The particle separator of claim 3, wherein the impeller blades, impeller shaft and at least a portion of the housing joining the outer ends of the impeller blades, are integrally molded of plastic.

15. The particle separator of claim 4, wherein the impeller blades, impeller shaft and at least a portion of the housing joining the outer ends of the impeller blades, are integrally molded of plastic.

16. The particle separator of claim 5, wherein the impeller blades, impeller shaft and at least a portion of the housing joining the outer ends of the impeller blades, are integrally molded of plastic.

17. A vortex particle separator comprising:
a housing extending along a longitudinal axis and having an air inlet at an upstream end, an air outlet at a downstream end, and a discharge opening at the downstream end;
an outlet guide at a downstream end;
an impeller proximate the air inlet, the impeller having an impeller shaft extending along the longitudinal axis and three to six impeller blades all extending continuously in one of a clockwise or counterclockwise spiral along and around the shaft and extending between the shaft and the housing, each impeller blade having the same pitch, each impeller blade having an upstream facing surface and an opposing downstream facing surface, each upward facing surface being tangent to an outer diameter of the impeller shaft or to an imaginary cylinder coaxial with the impeller shaft that is from 10% to 1% smaller in diameter than the actual outer diameter of the impeller shaft in a plane orthogonal to the axis of the impeller shaft, with the juncture of an upstream end of each impeller blade and the impeller shaft leading the juncture of the upstream end of each impeller blade and the housing by an angle Θ measured in the direction of rotation, when viewed downstream along the impeller axis.

18. The particle separator of claim 5, wherein:
the air outlet is at least partially defined by an outlet guide positioned at the downstream end of the housing;
the outlet guide is single, tubular piece having an upstream portion, a middle portion and downstream end portion;
the upstream portion has a tubular, frusto-conical shape with a smaller diameter upstream end and a larger diameter downstream end that connects to the middle portion by a shoulder that extends radially outward;
the middle portion has an outer diameter sized the same as or slightly smaller than an inner diameter of an adjacent portion of the housing; and
the downstream portion and the housing are of outer diameter and thickness, with the downstream portion being connected to the middle portion by a downstream shoulder extending radially outward between a downstream end of the middle portion and an upstream end of the downstream portion.

19. The particle separator of claim 18 wherein a downstream end of the impeller is spaced apart from the upstream portion of the outlet guide a distance sufficient to separate particles of a predetermined density or size from an air stream passing through the upstream end of the outlet guide.

20. The particle separator of claim 17 wherein:
the discharge opening is located along the axis somewhere along the axial length of the outlet guide, at a location where the particulates separated from the airstream can be discharged from inside the housing; and
the discharge opening extends around about ⅓ the circumference of the downstream end of the housing, and extends axially from the about the middle of the upstream portion to the juncture of the downstream shoulder of the outlet guide with the housing.

* * * * *